United States Patent Office 2,952,649
Patented Sept. 13, 1960

2,952,649

EMULSIFIABLE SELF-POLISHING WAX CONTAINING OXIDIZED POLYETHYLENE AND PARAFFIN AND PROCESS FOR PREPARING SAME

Marvin A. McCall and Harry W. Coover, Jr., Kingsport, Tenn., assignors to Eastman Kodak Company, Rochester, N.Y., a corporation of New Jersey No Drawing. Filed July 7, 1955, Ser. No. 520,613

6 Claims. (Cl. 260—28.5)

This invention relates to a new wax composition of matter and to the process for its production. More particularly, it concerns a new emulsifiable self-polishing wax composition that can be used as a carnauba replacement in aqueous self-polishing emulsions.

Carnauba wax has been highly valued for its unique characteristics such as gloss, hardness, and ease of emulsifiability in water to form self-polishing emulsions. However, these valuable properties are offset to a considerable extent by its being non-uniform, limited in supply, its foreign origin and its high and fluctuating price. Moreover, carnauba wax occurs naturally in tropical regions which are accessible with difficulty. Accordingly, a substitute for this wax has long been desired which would be commercially available, inexpensive and constant in quality.

Many attempts to obtain waxes with carnauba-like properties are recorded in the prior art. For example, Lovell and Straw, U.S. Patent 2,523,705, issued September 26, 1950, claims improved wax properties are obtained by heating polyethylene in paraffin at 320° F. with vigorous stirring. Also, Lovell U.S. Patent 2,569,773, dated July 17, 1951, makes similar claims for materials prepared by heating polyethylene and oxidized microcrystalline wax to 400° F. However, none of the waxes prepared according to the prior art methods were found to have the properties we desired for use in a self-polishing aqueous emulsion.

We have discovered that waxes with properties similar to or surpassing those of carnauba can be prepared by oxidizing mixtures of polyethylene and paraffin with an oxygen-containing gas.

One object of this invention is to produce waxes with properties similar to those of carnauba wax. Another object is to prepare hard waxes that can be readily emulsified to form stable self-polishing aqueous emulsions that are useful in producing hard, high gloss, waxy surfaces. A further object is to provide a hard emulsifiable wax which is uniform in quality, commercially available and relatively inexpensive. An additional object is to provide a hard emulsifiable wax whose hardness can be adjusted to meet particular needs.

We have discovered that the above objects may be obtained by oxidizing a mixture of from 70 to 95% polyethylene having a molecular weight between 2500 and 6000 with from about 30 to 5% paraffin. The paraffin is any grade of paraffin that does not contain oxidation inhibitors. The polyethylene may be obtained by polymerizing ethylene under relatively low ethylene pressures (below 10,000 pounds per square inch) or by the thermal degradation of high molecular weight ethylene polymers to the molecular weight desired. While a wide weight range of polyethylenes are operative under this process and yield waxes which are emulsifiable, the preferred molecular weight range is 3,000 to 4,500.

The oxidation is carried out in the temperature range of 120° to 140° C. using an oxygen containing gas. The rate of oxidation increases with increasing temperature, but temperatures above 140° C. usually produce dark and viscous waxes and the temperatures below 120° C. result in a very slow oxidation rate. Organic peroxides such as cumene hydroperoxide or di-tert-butyl peroxide may or may not be used in the process. However, shorter induction periods are observed when such catalysts are used.

The oxidation time is from 4 to 15 hours and is dependent upon the oxidation temperature, molecular weight of the polyethylene, the amount of paraffin used, the oxygen or air rate and upon a final acid number desired. Acid numbers in the 5–20 range are preferred since waxes with acid numbers within this range are readily emulsifiable by the usual emulsifiable procedures. Waxes with acid numbers below 5 are usually more difficult to emulsify than those with acid numbers of 5 or above. However, when the oxidation is carried out in the presence of 0.5–1% alkali carbonates or amines the wax may have an acid number of from 1–15 and still be readily emulsifiable.

The following examples are intended to illustrate our invention but are not meant to limit it in any way.

EXAMPLE 1

A mixture of 140 g. polyethylene (mol. wt. 3900) and 60 g. paraffin was melted in a 500-ml. three-neck flask equipped with a stirrer, fritted glass bubbler and a water-cooled condenser through which was placed a thermometer or thermocouple. After the mixture was melted, 2.0 g. of di-tert-butyl peroxide catalyst was added and air bubbled into the melt at the rate of 340 ml. per min. for 10 hours. The exit gases were passed from the top of the condenser through a tube and bubbled into three inches of water, thereby maintaining a slight pressure in the oxidation flask. The stirrer speed was maintained at a rapid rate to insure a thorough mixing of the air with the wax melt. The temperature of the reaction was maintained at 130° C. by external heating.

The resulting wax was then hardened by vacuum stripping which removed part of the low-boiling oxidation products. The vacuum-stripping process was carried out by heating the oxidized wax to 225–235° C. under 1 or 2 mm. pressure until no more material distilled at this temperature. The vacuum-stripped wax was then cooled to 165–175° C. and poured into suitable molds or if finely divided material was desired, it was poured slowly into vigorously stirred methanol, ethanol, heptane or hexane. The wax is insoluble in these solvents and precipitated into fine particles which were filtered and dried. This process removes some of the low-molecular weight oily products that are not removed by vacuum stripping.

The final yield of hard wax by this process was 180 g. (90%) having an acid number of 9, a molecular weight of 2400, and a penetration hardness of 4 mm. $\times$ $10^{-1}$; 200 g. for 5 seconds at 77° F. It was readily emulsified to give a transparent wax emulsion that produced a high gloss without rubbing or buffing.

EXAMPLE 2

A mixture of 140 g. polyethylene (mol. wt. 4200) and 60 g. paraffin was melted in a 500-ml. three-neck flask equipped with a stirrer, fritted glass bubbler and a water-cooled condenser through which was placed a thermometer or thermocouple. After the mixture was melted, 2.0 g. of di-tert-butyl peroxide catalyst and 2.0 g. anhydrous sodium carbonate were added and air bubbled into the melt at the rate of 340 ml. per min. for 12 hours. The exit gases were passed from the top of the condenser through a tube and bubbled into three inches of water thereby maintaining a slight positive air pressure on the wax melt. The stirrer speed was maintained at a rapid rate to insure a thorough mixing of the air with the melt. The temperature of the reaction was maintained at 130° C.

The product of this oxidation had an acid number of 6.24, a molecular weight of 2,900, and a penetration hardness of 3.75 mm.$\times 10^{-1}$; 200 g. for 5 seconds at 77° F. It was easily emulsified in an aqueous solution to give an almost transparent wax emulsion that produced a high gloss without rubbing or buffing.

EXAMPLE 3

A mixture of 190 g. polyethylene (mol. wt. 2,500) and 10 g. paraffin wax was melted in a 500-ml. three-neck flask equipped with a stirrer, fritted glass bubbler and a water-cooled condenser through which was placed a thermometer or thermocouple. After the mixture was melted, 2.0 g. cumene hydroperoxide and 2.0 g. anhydrous sodium carbonate were added and air bubbled into the melt at the rate of 340 ml. per min. for 8 hours. The exit gases were passed from the top of the condenser through a tube and bubbled into three inches of water, thereby maintaining a slight positive air pressure on the wax melt. The stirrer speed was maintained at a rapid rate to insure a thorough mixing of the air with the melt. The temperature of the oxidation mixture was maintained at 130° C.

The wax from this oxidation had an acid number 3.5, and a penetration hardness of 3 mm. $\times 10^{-1}$; 100 g. for 5 seconds at 77° F. It was easily emulsified in an aqueous solution to give an almost transparent wax emulsion that produced a high gloss without rubbing or buffing.

EXAMPLE 4

A mixture of 140 g. polyethylene (mol. wt. 6,000) and 60 g. paraffin was melted in a 500-ml. three-necked flask equipped with a stirrer, fritted glass bubbler and a water-cooled condenser through which was placed a thermometer or thermocouple. The mixture was melted and air bubbled into the hot melt (130° C.) at the rate of 340 cc. per min. for 14.5 hours. The exit gases were passed from the top of the condenser through a tube and bubbled into three inches of water, thereby maintaining a slight pressure in the oxidation flask. The stirrer speed was maintained at a rapid rate to insure a thorough mixing of the air with the wax melt.

The product of this oxidation had an acid number of 5.92, and a mol. wt. of 4,700 and a penetration hardness of 0 (mm. $\times 10^{-1}$); 100 g./5 sec. at 77° F. It formed a self-polishing aqueous emulsion.

EXAMPLE 5

A mixture of 160 g. polyethylene (mol. wt. 4,000) and 40 g. paraffin was melted in a 500-ml. three-necked flask equipped with a stirrer, fritted glass bubbler and a water-cooled condenser through which was placed a thermometer or thermocouple. After the mixture was melted, 2.0 g. di-tert-butyl peroxide and 1.0 g. anhydrous sodium carbonate were added and oxygen bubbled into the melt at the rate of 340 ml. per min. for 13 hours. The temperature was maintained at 125–130° C. and the mixture vigorously stirred. The exit gases were passed from the top of the condenser through a tube and bubbled into three inches of water, thereby maintaining a slight positive pressure on the wax melt.

The wax from this oxidation was poured into vigorously stirred methanol then filtered and dried. It had an acid number of 19.5 and a penetration hardness of 2.5–3.0 (mm. $\times 10^{-1}$); 100 g./5 sec. at 77° F. It emulsified readily to give a self-polishing emulsion.

The above material was further treated by vacuum stripping at 235° under 1 mm. pressure until no further material distilled from the melt under these conditions. The final wax had a penetration hardness of $$1 \text{ mm.} \times 10^{-1}$$

100 g./5 sec. at 77° F., and an acid number of 11. It too was easily emulsified to give a good self-polishing emulsion.

EXAMPLE 6

Preparation of water emulsions

The wax (25 g., obtained in Examples 1 through 5) and oleic acid (4.4 and 5.6 g.) are blended at 270° F. Resins may be added at this point if desired. This blend was then cooled to 210–215° F. and an amine such as 2-amino-2-methyl-1-propanol (2.7 g.), morpholine (3.5 g.) or monoethanolamine (2.4 g.) was added. The mixture was stirred for 5 minutes at this temperature, then poured slowly with rapid stirring into 250 g. of water at 200° F. Stirring was continued until the emulsion became uniform.

The hot emulsion may then be diluted up to twice its volume with an aqueous solution containing various resins and leveling agents without breaking the emulsion. In this example, the leveling agent solution was added during agitation and cooled to room temperature.

EXAMPLE 7

Preparation of water emulsions

The wax (25 g. obtained in Examples 1 through 5) and oleic acid (4.4 to 5.6 g.) were blended by heating to 270° F. in a container large enough for the complete emulsion (resins may be added if desired). The mixture was then cooled to 210–215° F. and an amine such as 2-amino-2-methyl-1-propanol (2.7 g.), morpholine (3.5 g.) or monoethanolamine (2.4 g.), was added with stirring. If borax is desired in the emulsion, it is added at this point as a saturated solution in water. The mixture was stirred at 210–215° F. for 5 minutes. The stirrer was stopped and the total required amount of boiling water (250 g.) was added rapidly. The mixture was then slowly agitated until the emulsion became uniform. A cold solution of leveling agent may be added during agitation and cooling to room temperature if desired.

The penetration hardness of the oxidized wax is an important property that can be controlled in part by selecting the proper molecular weight polyethylene and paraffin concentrations. Those mixtures containing polyethylenes of high-molecular weight and low paraffin concentration are usually harder final waxes than those containing low-molecular weight polyethylenes and high concentrations of paraffin. The hardness of our oxidized wax may be further modified by vacuum stripping the oxidized wax under 1–2 mm. pressure, which in effect removes low-molecular weight materials from the oxidized wax mixtures thus increasing the hardness. Further modification of the hardness property may be obtained by extracting the hot oxidized mixture with such solvents as methanol, ethanol, hexane, heptane, or mixtures of these solvents. A still further method of increasing the hardness of our oxidized wax is to use alkali carbonates in small amounts (0.5 to 1%) in the oxidation mixture or to react the oxidized wax with alkali carbonates. This technique appears to be operative by converting part of the low-molecular weight acids to salts which increases the crystallinity and in turn, the hardness of the resulting wax. Generally, oxidation increases the penetration hardness value of the wax mixture, but by the use of alkali carbonates (approx. 1% by weight of wax) the penetration is actually reduced as oxidation proceeds.

Polyethylenes of lower molecular weight than 2,500, when mixed with paraffin, oxidize rapidly and yield waxes which are too soft as a carnauba replacement. Wax of molecular weight higher than 6,000, when mixed with paraffin, are more difficult to oxidize and yield waxes which are too viscous for use as carnauba replacements.

The waxes prepared by our invention may be emulsified simply and easy in water, whereas those of the prior art cannot. These waxes may be used to produce hard, high gloss, waxy surfaces on floors, linoleum, tile, furniture, and the like. In addition, to the above outstanding features of our wax, it has a low softening point of from 90–110° C. and a thin melt viscosity desired by many wax formulators who use steam as a heat source in preparing emulsions. These unique properties are due to the particular composition of matter produced by our invention which is especially unexpected since mixtures of polyethylene and paraffin when oxidized separately fail to give an emulsifiable product.

One of the outstanding characteristics of natural carnauba wax is its hardness. In a penetrometer at 100° F. and in five seconds with a 200 g. weight carnauba wax gives a reading in the range of 1 to 2. Under identical conditions the synthetic wax produced by the oxidation of a mixture of paraffin and polyethylene gives readings of 4 or lower. The penetration hardness was determined on solid wax with a Micro-Adjustment Penetrometer made by the American Instrument Company. The penetration hardness was measured in tenths of a millimeter at 77° F. (25° C.) using a 100 g. or 200 g. weight on the penetrometer needle for five seconds.

We claim:

1. An emulsifiable self-polishing wax consisting of a mixture containing from 70 to 95% polyethylene having a molecular weight between 2,500 and 6,000 with 30 to 5% paraffin wax, the mixture having been oxidized with oxygen at a temperature of between 120 to 140° C. to an acid number of 5 to 20.

2. An emulsifiable self-polishing wax consisting of a mixture containing from 70 to 95% polyethylene having a molecular weight between 2,500 and 6,000 with 30 to 5% paraffin wax and 0.5 to 1% alkali metal carbonate, the mixture having been oxidized with oxygen at 120 to 140° C. to an acid number of from 1 to 15.

3. A process for the formation of an emulsifiable self-polishing wax comprising mixing from 70 to 95% polyethylene having a molecular weight of 2,500 to 6,000 with about 30 to 5% paraffin wax and oxidizing the mixture with oxygen at a temperature of from 120 to 140° C. to an acid number of from 5 to 20.

4. A process for the production of an emulsifiable, self-polishing wax comprising mixing from 70 to 95% polyethylene having a molecular weight between 2,500 and 6,000 with about 30 to 5% paraffin wax and 0.5 to 1% alkali carbonate and oxidizing the mixture with oxygen at a temperature of 120 to 140° C. to an acid number of 1 to 15.

5. A product as described in claim 1 in which the oxidized wax is further modified by vacuum stripping the oxidized wax under 1–2 mm. of pressure to remove low molecular weight materials from the oxidized wax mixtures and thereby increase the hardness.

6. A product according to claim 1 in which the hardness of the wax produced is increased by extracting the hot oxidized wax with a solvent selected from the class consisting of methanol, ethanol, hexane, and heptane.

References Cited in the file of this patent

UNITED STATES PATENTS

| | | |
|---|---|---|
| 2,298,846 | Skooglund | Oct. 13, 1942 |
| 2,350,007 | Zerbe | May 30, 1944 |
| 2,464,219 | Doyle et al. | Mar. 15, 1949 |
| 2,471,102 | Fish | May 24, 1949 |
| 2,504,270 | MacLaren | Apr. 18, 1950 |
| 2,523,705 | Lovell et al. | Sept. 26, 1950 |
| 2,601,109 | Fish | June 17, 1952 |
| 2,728,735 | Anderson | Dec. 27, 1955 |
| 2,734,882 | Kirsch | Feb. 14, 1956 |
| 2,879,239 | De Groote et al. | Mar. 24, 1959 |

FOREIGN PATENTS

| | | |
|---|---|---|
| 581,279 | Great Britain | Oct. 7, 1946 |